Figure 1:
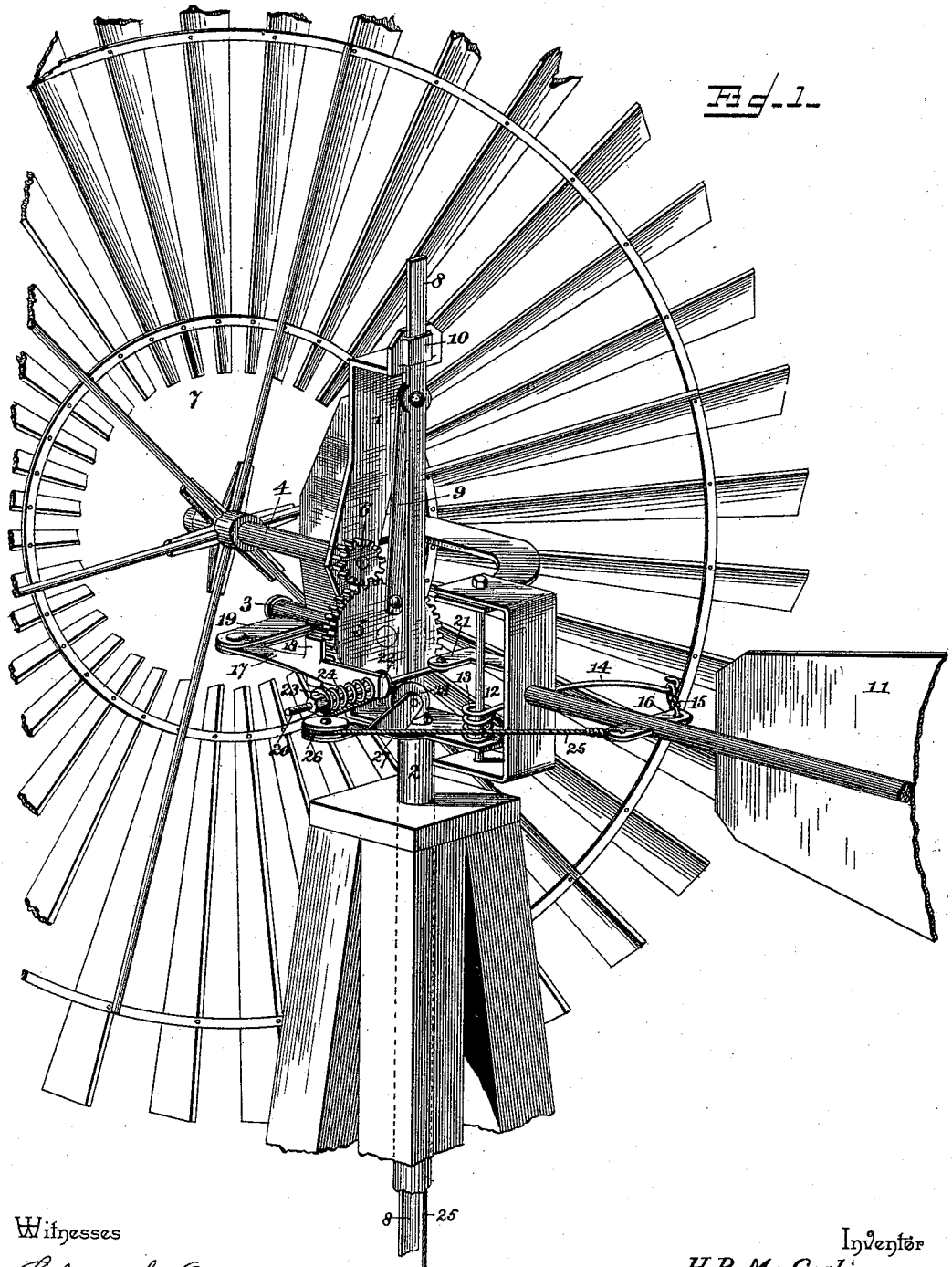

(No Model.) 2 Sheets—Sheet 1.

H. B. McCOSLIN.
WINDMILL.

No. 492,097. Patented Feb. 21, 1893.

Witnesses
Chas. H. Ourand
H. J. Riley

Inventor
H. B. Mc. Coslin.

By his Attorneys,
C. A. Snow & Co.

(No Model.) 2 Sheets—Sheet 2.
H. B. McCOSLIN.
WINDMILL.
No. 492,097. Patented Feb. 21, 1893.
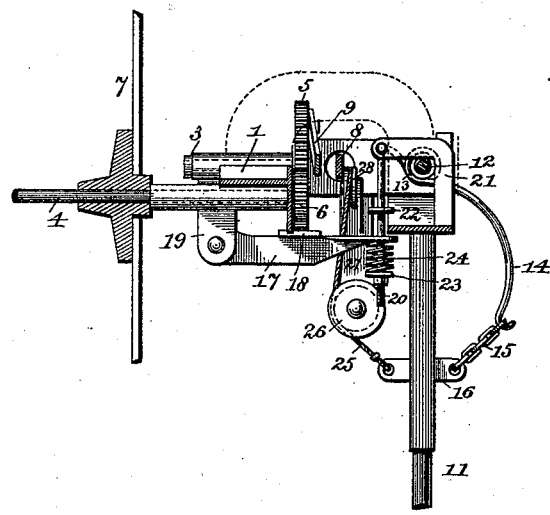
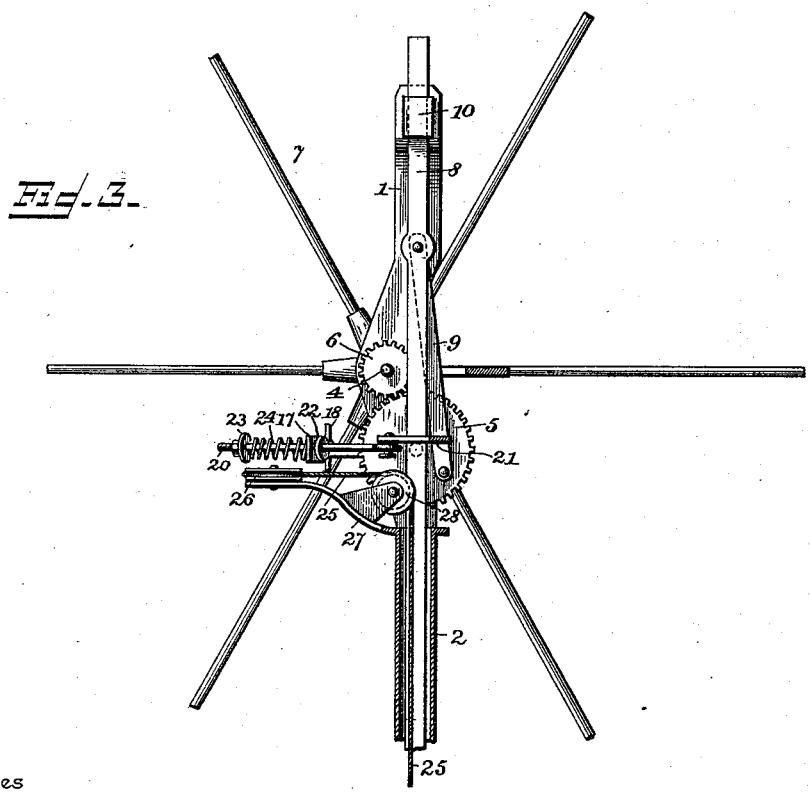
Witnesses
Chas. H. Ourand
N. J. Riley
Inventor
H. B. McCoslin
By his Attorneys,
C. A. Snow & Co.
THE NORRIS PETERS CO., PHOTO-LITHO., WASHINGTON, D. C.

UNITED STATES PATENT OFFICE.

HENRY B. McCOSLIN, OF LITCHFIELD, ILLINOIS.

WINDMILL.

SPECIFICATION forming part of Letters Patent No. 492,097, dated February 21, 1893.

Application filed April 9, 1892. Serial No. 428,519. (No model.)

*To all whom it may concern:*

Be it known that I, HENRY B. MCCOSLIN, a citizen of the United States, residing at Litchfield, in the county of Montgomery and State of Illinois, have invented a new and useful Windmill, of which the following is a specification.

The invention relates to improvements in wind mills.

The object of the present invention is to simplify and improve the construction of wind mills, and to provide one which will be automatic in its operation and which will when thrown out of the wind, hold its wheel perfectly still.

The invention consists in the construction and novel combination and arrangement of parts hereinafter fully described, illustrated in the accompanying drawings and pointed out in the claims hereto appended.

In the drawings—Figure 1 is a perspective view of a wind mill constructed in accordance with this invention. Fig. 2 is a horizontal sectional view showing the position of the parts when the wind wheel is out of the wind. Fig. 3 is a vertical sectional view.

Like numerals of reference indicate corresponding parts in all the figures of the drawings.

1 designates a frame secured to the upper end of a tube 2, and designed to be rotatively mounted on the tower, and provided with bearings for a stub shaft 3 and a main shaft 4, which shafts are geared together by a cog wheel 5 and a pinion 6, and the main shaft 4 carries a wind wheel 7; and motion is communicated from the cog wheel 5 to a pump rod 8 by a pitman 9. The pump rod 8 is arranged in a suitable guide 10 of the frame, and the gear wheels 5 and 6 are so disposed that greater power is produced than would be the case were the main shaft connected directly to the pitman, thereby enabling a great quantity of water to be pumped in a short time. A vane 11 is hinged to the frame by a rod 12 and it is held into the wind by a spiral spring 13 which is mounted on the frame and which is provided with an arm 14, and is connected with the vane by a chain 15 having one end secured to the outer end of the arm 14 and its other end attached to a plate 16. The arm 14 is provided at its outer end with a hook which is adapted to engage any one of the links, whereby the tension of the spring may be regulated so as to hold the vane into the wind with the desired force. When the force of the wind exceeds the strength of the spring, the vane will be turned and the wind wheel will be thrown out of the wind sufficiently to maintain the desired speed, and in case of storms the wind wheel will be thrown entirely out of the wind. When the wind wheel is out of the wind it is held stationary by a brake lever 17 provided intermediate its ends with a brake shoe 18 to engage the cog wheel 5, and having one end pivoted to an arm 19 of the frame, and its other end provided with an opening to receive a rod 20 on which it is loosely arranged. The rod has its inner end pivotally connected with an L-shaped arm 21 of the vane, and is provided with shoulders 22 and 23 between which the brake lever is arranged; and a spiral spring 24 is interposed between the brake lever and the outer shoulder 24 and is disposed on the rod. The vane when at right angles to the wheel, holds the brake shoe out of engagement with the cog wheel as the inner shoulder 22 engages the brake lever and carries it outward; but, when the vane is parallel with the wheel, the rod is drawn inward carrying the inner shoulder 22 away from the brake bar, and the latter into engagement with the cog wheel and the spring 24 serves as a cushion for the brake bar. The outer shoulder 23 of the rod is formed by a nut, and the rod is threaded so that the nut may be moved thereon to regulate the tension of the spring 24. The wind wheel is drawn out of the wind from below by a rope 25 which has one end secured to the plate 16 of the vane, and which passes around a pulley 26 at the outer end of an arm 27 of the frame, and around a guide pulley 28 at the inner end of the arm and through the tube 2 downward to the base of the tower.

It will be seen that the wind wheel is simple and comparatively inexpensive in construction, and that it is automatic in its operation.

What I claim is—

1. In a wind mill, the combination of a frame, a vane hinged to the frame, a spiral spring mounted on the frame and provided with an arm terminating at its outer end in a hook, and a chain secured to the vane and adapted to have any one of its links engaged by the hook of the spring and regulating the tension of the latter, substantially as described.

2. In a wind mill, the combination of a frame, a shaft journaled in suitable bearings of the frame, a cog wheel mounted on the shaft, a vane hinged to the frame, a brake lever having one end fulcrumed on the frame and provided intermediate of its ends with a brake shoe to engage the cog wheel, an L-shaped arm rigidly secured to the vane and extending inward therefrom, a horizontal rod having its inner end pivotally connected to said arm and having its outer end threaded and provided with a nut and having intermediate of its ends a shoulder and loosely connected with the brake lever between its shoulder and its threaded portion, and a spiral spring disposed on the rod and located between the nut and the brake-lever, substantially as described.

In testimony that I claim the foregoing as my own I have hereto affixed my signature in the presence of two witnesses.

HENRY B. McCOSLIN.

Witnesses:
 W. T. BISHOP,
 J. T. BROWN.